United States Patent [19]
Corrigan et al.

[11] Patent Number: 6,016,525
[45] Date of Patent: Jan. 18, 2000

[54] INTER-BUS BRIDGE CIRCUIT WITH INTEGRATED LOOPBACK CAPABILITY AND METHOD FOR USE OF SAME

[75] Inventors: Brian E. Corrigan; Alan D. Rymph, both of Wichita, Kans.

[73] Assignee: LSI Logic Corporation, Milpitas, Calif.

[21] Appl. No.: 08/819,018

[22] Filed: Mar. 17, 1997

[51] Int. Cl.[7] .................................................. G06F 13/00
[52] U.S. Cl. ......................... 710/100; 710/101; 710/128; 710/129
[58] Field of Search ................................... 395/280, 309, 395/308, 325, 842, 287; 364/200

[56] References Cited

U.S. PATENT DOCUMENTS

| | | | |
|---|---|---|---|
| 4,987,529 | 1/1991 | Craft et al. | 364/200 |
| 5,161,162 | 11/1992 | Watkins et al. | 714/43 |
| 5,396,602 | 3/1995 | Amini et al. | 395/325 |
| 5,438,666 | 8/1995 | Craft et al. | 395/842 |
| 5,442,697 | 8/1995 | McGary et al. | 379/399 |
| 5,450,551 | 9/1995 | Amini et al. | 710/119 |
| 5,455,915 | 10/1995 | Coke | 710/113 |
| 5,548,730 | 8/1996 | Young et al. | 710/100 |
| 5,557,758 | 9/1996 | Bland et al. | 395/308 |
| 5,632,021 | 5/1997 | Jennings et al. | 395/309 |
| 5,717,875 | 2/1998 | Cultlerywala et al. | 395/308 |
| 5,745,772 | 4/1998 | Klein | 395/739 |
| 5,771,359 | 6/1998 | Galloway et al. | 710/128 |
| 5,845,094 | 12/1998 | Beauchamp et al. | 395/280 |

*Primary Examiner*—Ayaz R. Sheikh
*Assistant Examiner*—Eric S. Thlang

[57] ABSTRACT

A bus bridge circuit having an internal loopback capability involving a shared memory interface integrated therewith. The bridge circuit of the present invention includes a primary PCI interface, a secondary PCI interface, and a shared memory interface. Transfer between the primary and secondary interfaces may proceed in parallel with transfers between the secondary interface and the shared memory interface. A single master device on the primary bus may perform loopback testing of the bridge circuit by directing downstream transactions between the primary interface and the shared memory interface via the secondary interface. Configuration parameters of the bridge circuit permit the address range of the shared memory interface to temporarily overlap the address range of the secondary interface. The primary bus master device configures such an overlapping range and directs transactions to the secondary interface in the overlapping address range. The transactions apply data to bi-directional I/O pads associated with the secondary interface and connected to both the primary interface and to the shared memory interface. The simultaneously active shared memory interface thereby receives the transfers through the overlapping address range and returns data via the same path. This structure simplifies testing of the bridge circuit by enhancing the test coverage possible in each test vector thereby reducing the number of test vectors required. In addition, the loopback mode of operation of the bridge circuit aids in fault isolation in a board/application test environment.

18 Claims, 4 Drawing Sheets

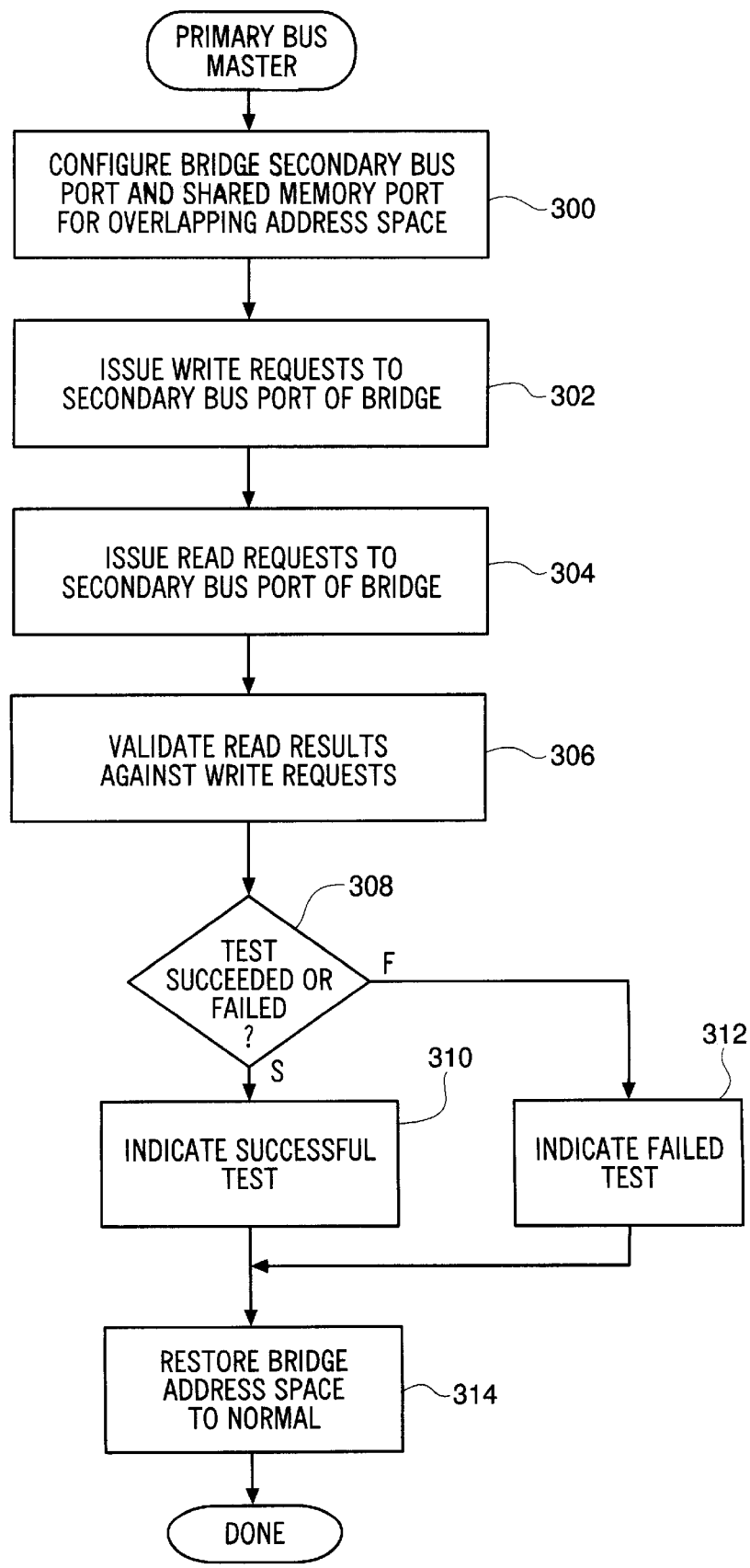

INTER-BUS BRIDGE CIRCUIT WITH INTEGRATED LOOPBACK CAPABILITY AND METHOD FOR USE OF SAME

RELATED PATENTS

This patent is related to commonly assigned, co-pending, U.S. patent application Ser. No. (95-096/9020-125) entitled SCALABLE HIERARCHICAL MEMORY STRUCTURE FOR HIGH DATA BANDWIDTH RAID APPLICATIONS filed mm/dd/yy which is hereby incorporated by reference. This patent is also related to commonly assigned, co-pending, U.S. patent application Ser. No. 08/357,847, filed Dec. 16, 1994 by Stewart et al., entitled (as amended) DISK ARRAY STORAGE SYSTEM ARCHITECTURE FOR PARITY OPERATIONS SIMULTANEOUS WITH OTHER DATA OPERATIONS, which is hereby incorporated by reference. This patent is also related to commonly assigned, co-pending, U.S. patent application Ser. No. (96-024/9020-128), filed mm/dd/yy by Corrigan et al., entitled INTER-BUS BRIDGE CIRCUIT WITH INTEGRATED MEMORY PORT, which is hereby incorporated by reference.

BACKGROUND OF THE INVENTION

1. Field of the Invention

The invention relates to the field of bus bridge integrated circuits and in particular to a bus bridge circuit design which includes an internal capability for loopback tests involving the secondary interface and an integrated shared memory interface.

2. Discussion of Related Art

Bridge circuits are known to connect a first electronic bus to a second electronic bus. The bridge circuit serves to adapt the signals of the two buses to enable data exchange between the two bus signal standards. Frequently, bridge circuits are used to convert between different signaling standards defined for the first and second buses. Another common application of bus bridge circuits, as discussed in related applications, incorporated herein by reference, is to connect multiple, often hierarchical buses to common devices or memory subsystems.

In RAID storage subsystem control applications, for example, a Peripheral Computer Interconnect (PCI) bus is used to connect various peripheral I/O devices through a bridge circuit to a centralized PCI bus for the overall control of all I/O devices in the subsystems as well as the cache memory subsystem.

It is common in the prior art that a bridge circuit is used to connect the various devices in the RAID subsystem both for purposes of I/O control and data exchange and for direct access to the cache memory subsystem. In such a centralized, hierarchical bus structure, the bus connected to the bridge circuit in common with other connections of other bridge circuits is referred to herein as the primary side, primary interface, or primary bus. The bus connected to the bridge circuit on the opposite side of the bridge relative to the primary side is referred to herein as the secondary side, secondary interface, or secondary bus. It is common in many well known bus structures to refer to a device which initiates a transaction as a master or initiator device while the device to which the transaction is directed is referred to as a slave or target device. For example, in PCI bus applications, the initiating devices is referred to as a master and the responding device is referred to as a target. A transaction directed from a primary bus master device to a secondary bus slave/target device (whether a read or write) is referred to as a downstream transaction. Conversely, a transaction directed from a secondary bus master device to a primary bus slave/target device is referred to as an upstream transaction.

It is a problem in such bridge circuit designs to effectively test the bridge circuit independent of devices attached to each of the buses connected by the bridge. In PCI buses for example, a device is normally required on the primary bus and a corresponding device is required on the secondary bus. Each device may serve, in turn, as a master while the opposite device serves as a slave to test the bridge circuit data path in a first mode of operation. The devices then switch master/slave roles to test the bridge circuit in a second mode of operation.

Isolation of faults in the testing of bridge circuits in isolation as well as testing of bridge circuits in their respective application environments is a continuing problem for design engineers. Determining whether a particular fault lies in the bridge circuit itself or in the externally connected buses or devices is a difficult problem when a circuit is initially designed and tested.

It is evident from the above discussion that a need exists for an improved bus bridge circuit design which reduces the complexity of testing the bridge circuit operation.

SUMMARY OF THE INVENTION

The present invention solves the above and other problems, thereby advancing the state of the useful arts, by providing an improved bridge circuit design in which a loopback mode using a simultaneously active shared memory interface improves chip test coverage and fault isolation capabilities of a bridge circuit. The bridge circuit of the present invention includes a shared memory interface usable by the secondary bus to access an attached memory subsystem regardless of the present availability of the primary bus and independent of any activity on the primary bus. The I/O pads which connect the shared memory interface to the secondary bus are bi-directional and also connect the secondary bus to the primary bus. Specifically, the bridge circuit of the present invention provides a loopback mode of operation in which a master device on the primary bus may access the shared memory via the secondary bus I/O pads and the shared memory interface to test bi-directional communication through the bridge circuit. The bridge circuit present invention and methods for operation thereof improves the testability of the circuit by using the shared memory interface in conjunction with the primary interface to test downstream transactions.

The loopback mode of the bridge circuit improves testability of the bridge circuit and its application. First, test vector efficiency is improved by use of the loopback mode in isolated chip test operations. A test vector (stimulus) applied to the chip may test a larger portion of the chip circuits by use of the loopback transfer mode as compared to prior bridge circuit designs. The number of vectors may therefore be decreased by using the loopback mode to test more of the chip with each set of stimuli. Second, board test may be improved by permitting use of the loopback mode to aid in isolating the cause of a particular fault. Specifically, the circuit may be more fully tested by operation of the chip in a loopback mode under the direction of a master device attached to the primary bus in conjunction with a shared memory attached to the shared memory interface.

In the preferred embodiment, an external device master on the primary bus may configure an address space associated with the secondary bus interface as well as an address space associated with the shared memory interface of the bridge circuit. Configuration registers of the bridge circuit are manipulated by the external primary bus master device to configure the address spaces of the bridge circuit. To enable the loopback operation in this preferred embodiment, the external primary bus master device temporarily configures the bridge circuit so that at least a portion of the address space assigned to the secondary bus overlaps with the address space assigned to the shared memory interface. The primary bus master device then generates a transfer to a predetermined address falling within the overlapping memory space defined by the bridge circuit for the secondary bus shared memory interface. The transfer is driven onto the secondary bus I/O pads by the bridge circuit.

The bi-directional I/O pads associated with the secondary bus also serve as input to the shared memory interface for transfers initiated by an external master on the secondary bus. The shared memory interface therefore simultaneously receives the transaction on the bi-directional I/O pads as if it were initiated by an external secondary bus master device to the shared memory. Since the shared memory interface is configured to respond to the overlapping address range, the request is processed by the attached shared memory and appropriate data/status returned. The returned information is in turn viewed by the primary bus master device as a response from the addressed secondary bus device. The turnaround cycle transfer thereby tests the secondary bus circuits within the bridge circuit as well as the shared memory and shared memory interface of the bridge circuit with only a single primary bus master device attached to the bridge circuit.

It is therefore an object of the present invention to provide a bus bridge circuit having an internal loopback mode for testing operation of the circuit.

It is a further object of the present invention to provide a bus bridge circuit having an internal loopback mode to aid failure isolation of the bridge circuit.

It is another object of the present invention to provide a bus bridge circuit having an internal loopback mode to enable a primary bus master device to test downstream transactions within the bridge circuit.

It is another object of the present invention to provide a bus bridge circuit having an internal loopback mode to enable a primary bus master device to test the primary bus, the secondary interface, and a shared memory attached to a shared memory interface of the bridge circuit.

It is still a further object of the present invention to provide a PCI-PCI bus bridge circuit in which a master device on the primary PCI bus may test operation of the primary PCI bus, the circuit's primary PCI interface, the circuit's secondary PCI interface, the circuit's shared memory interface, and a shared memory attached to the bridge circuit.

The above and other objects, aspects, features, and advantages of the present invention will become apparent from the following description and the attached drawing.

BRIEF DESCRIPTION OF THE DRAWING

FIG. 4 is a flowchart describing the method of the present invention to operation a bridge circuit of FIG. 1 in a loopback test mode.

DETAILED DESCRIPTION OF THE PREFERRED EMBODIMENTS

Figure 1:
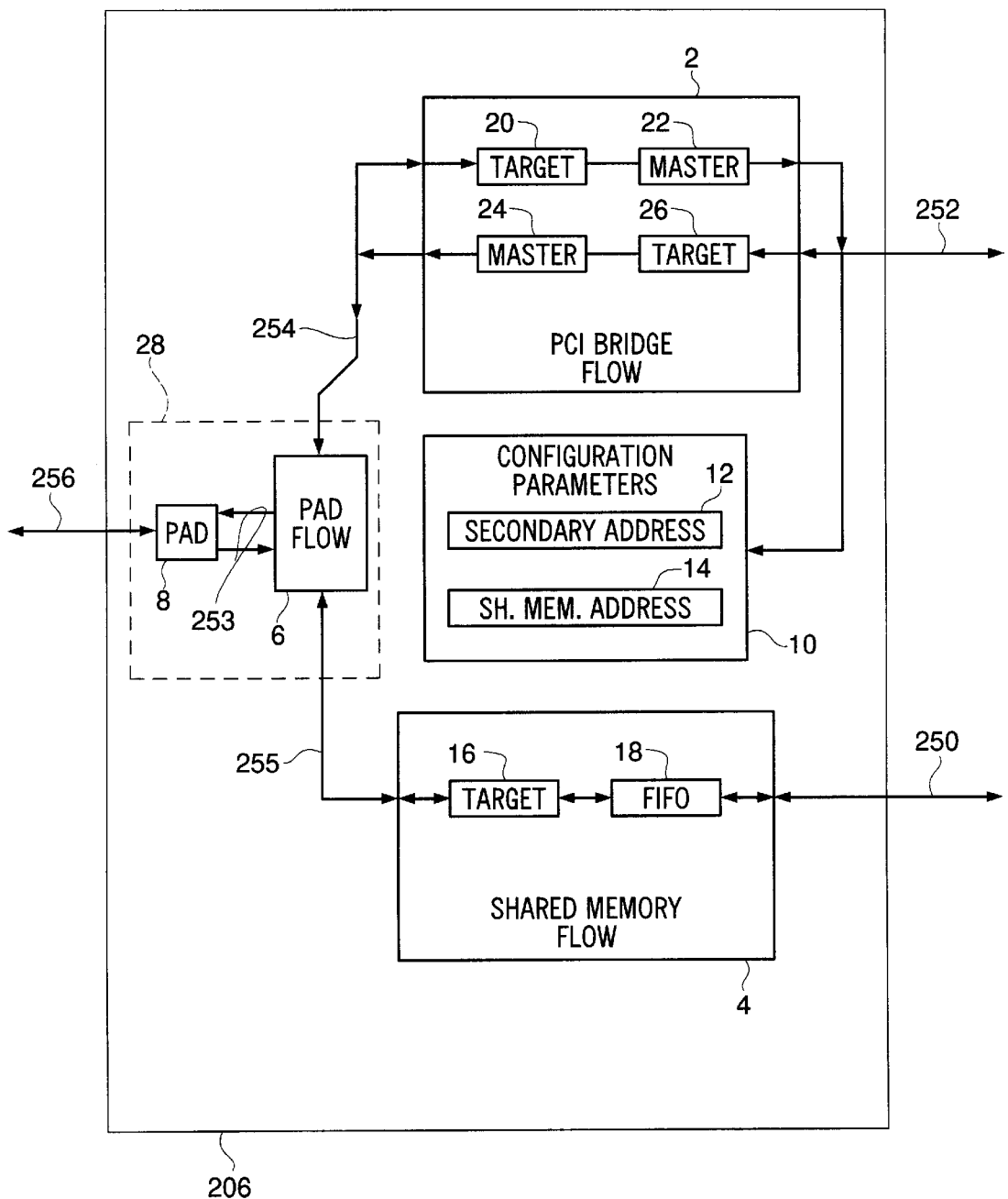
FIG. 1 is a block diagram of a bridge circuit of the present invention with a memory interface integrated therewith.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of the bus bridge circuit 206 having a loopback capability in accordance with the present invention. PCI bus bridge circuit 206 includes shared memory flow circuits 4 (also referred to herein as shared memory interface), PCI bridge flow control circuit 2 (also referred to herein as primary interface or primary bus interface), configuration parameter circuits 10, and pad flow circuits 6 with bi-directional I/O pad 8 and bus 253 (collectively also referred to herein as secondary interface or secondary bus interface 28). PCI bridge flow circuit 2 directs the bi-directional exchange of data between secondary PCI bus 256 and primary PCI bus 252. Primary PCI bus 252 is connected to secondary PCI bus 256 through PCI bridge flow control circuit 2, bus 254 and secondary bus interface 28 (e.g., pad flow circuit 6 and bi-directional I/O pad 8). Similarly, shared memory bus 250 is connected to secondary PCI bus 256 through shared memory flow circuits 4, bus 255, and secondary interface (circuits 6 and 8).

PCI bridge flow circuits 2 includes internal target and master components for controlling bus flow for downstream transactions (initiated by a bus master device on the primary PCI bus 252) and for managing upstream transactions initiated by a bus master devices on the secondary PCI bus 256. Target 20 and master 22 components present a target device protocol on the secondary PCI bus 256 (via bus 254, and secondary interface 28) and presents a master device protocol on the primary PCI bus 252. Upstream transactions involve a secondary PCI bus 256 master device communicating with the internal target 20 of PCI bridge flow circuits 2. Internal target device 20 transfers the transaction to internal master device 22 which then interacts with a target device on the primary PCI bus 252. Downstream transactions involve a primary PCI bus 252 master device communicating with the internal target 26 of PCI bridge flow circuits 2. Internal target device 26 transfers the transaction to internal master device 24 which then interacts with a target device on the secondary PCI bus 256 (via bus 254 and secondary interface 28).

The path connecting bus 252 and bus 254 via internal target 26 and internal master 24 is referred to herein as the downstream path of PCI bridge flow circuits 2. The path connecting bus 254 and bus 252 via internal target 20 and internal master 22 is referred to herein as the upstream path of PCI bridge flow circuits 2.

Shared memory flow circuits 4 includes internal target device 16 which presents a target device protocol to transactions applied to its configured address range on bus 255. A FIFO 18 buffers the interface between the internal target device 16 and the shared memory (not shown) connected to shared memory bus 250. In normal operation, such transactions are upstream transactions initiated from a master device on the secondary PCI bus 256 and addressed to a location within the address range of the shared memory bus 250. As discussed below, in the loopback mode of operation, the bridge circuit of the present invention allows a master device on the primary PCI bus 252 to transact with the internal target 16 of the shared memory flow circuits 4. Such transactions provide a tool for enhanced chip test functions as well as for improved fault isolation in a board test environment.

Bridge circuit 206 allows for operation of devices on secondary bus 256 to access shared memory. Independent of such access, primary bus 252 may be operable to perform other operations. For example, a CPU (e.g., a master device—not shown) connected to primary PCI bus 252 may access peripheral devices (not shown) connected to secondary PCI bus 256 and vice versa. However, regardless of the busy/idle status of primary PCI bus 252 due to other control operations by the CPU (not shown), devices on secondary PCI bus 256 may access a memory subsystem (not shown) connected to shared memory bus 250 via shared memory flow circuits 4.

Bridge circuit 206 includes configuration parameters 10 to define address ranges corresponding to, at least, secondary PCI bus 256 and shared memory bus 250. The address range corresponding to the secondary interface 28 is programmed by a master device on the primary PCI bus 252 into secondary address registers 12 of configuration parameters 10. The address range corresponding to the shared memory interface is programmed into shared memory registers 14 of configuration parameters 10. PCI bridge flow circuits 2 uses the secondary address registers 12 to determine which transactions on the primary PCI bus 252 are to be applied to the secondary interface 28. Shared memory flow circuits 4 uses the address range in shared memory address registers 14 to determine which transactions on the secondary PCI bus 256 (and therefore applied to bus 255) are to be applied to the shared memory bus 250.

Each control circuit (2 and 4) thereby recognizes data transfers requiring its attention based upon the address supplied in the transfer request. For example, when a device on the primary PCI bus 252 requires a transfer of data with a device on secondary PCI bus 256, a specific address is used within the range associated with the secondary PCI bus 256. PCI bridge flow circuits 2 recognize when an address is supplied in a transaction which matches its configured range for the secondary PCI bus 256. Likewise when a transfer is directed from a device on secondary PCI bus 256 to the shared memory on shared memory bus 250, a specific address is used within the range of addresses corresponding to the shared memory bus 250. Shared memory flow circuits 4 recognize when an address is supplied in a data transfer which matches its configured range for the shared memory bus 250.

Since buses 256, 255, and 254 are commonly attached to bi-directional I/O pads 8 (via pad flow circuit and bus 253), transactions can be initiated by an appropriately programmed master device from any of the buses to any of the buses. By suitably programming the configuration of the address ranges recognized in bridge circuit 206, a master device on the primary PCI bus may direct the exchange of data to be performed with the shared memory on shared memory bus 250 via signal applied through bi-directional I/O pads 8 to bus 255.

LOOPBACK MODE TEST OPERATION

Figure 2:
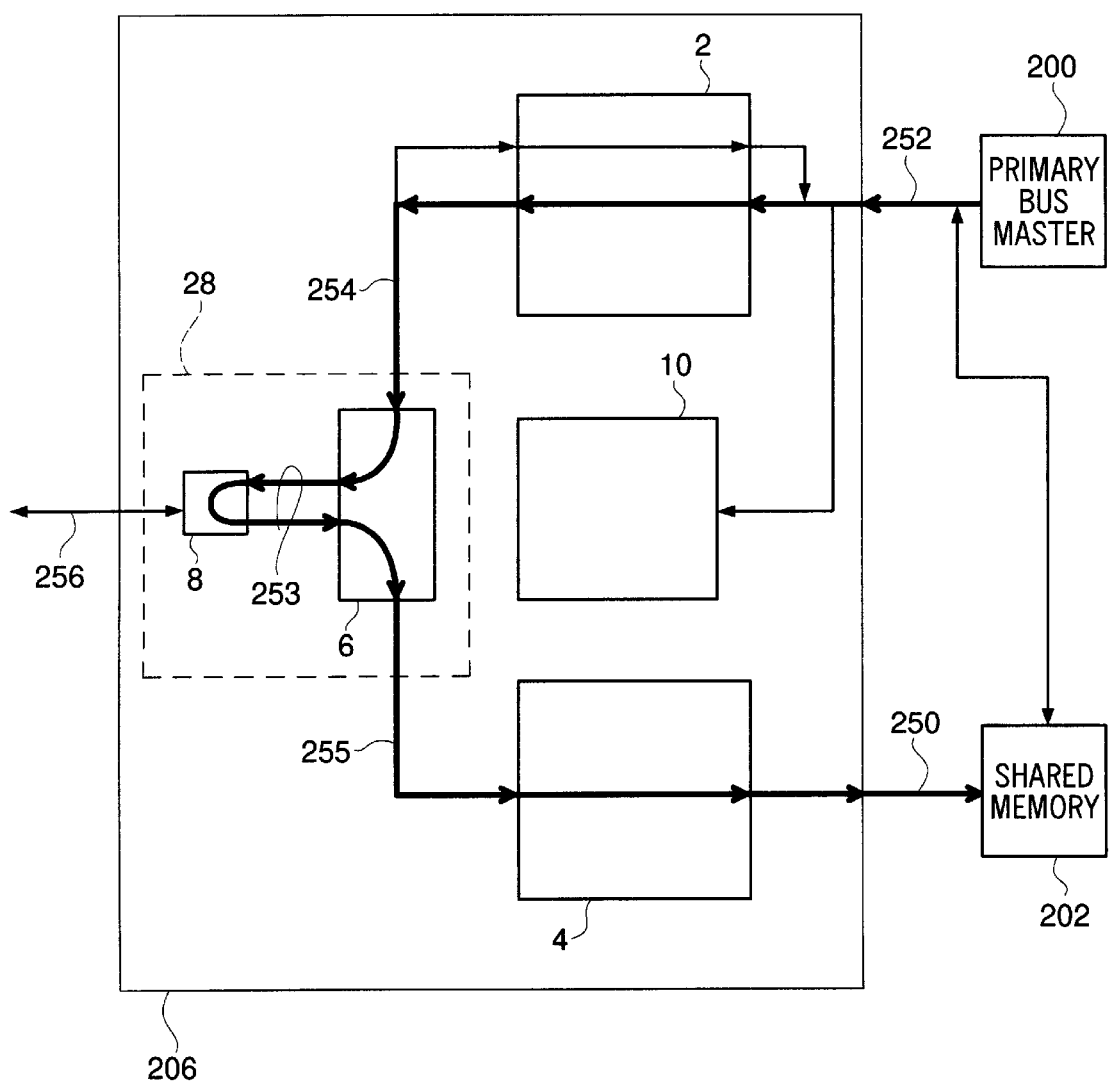
FIG. 2 is a block diagram of the bridge circuit of FIG. 1 operable to transfer information to a shared memory in a downstream write loopback mode transaction.

FIG. 2 depicts the flow of information in the bridge circuit of the present invention in a loopback mode of operation in accordance with the present invention. Primary bus master 200 on primary PCI bus 252 programs the address registers in configuration parameters 10. The address registers of configuration parameters 10 are programmed to provide an overlapping portion of the address ranges for the secondary PCI bus 256 and the shared memory bus 250.

With the loopback mode so configured, primary bus master 200 then initiates downstream transactions on the primary PCI bus 252. The downstream transactions are addressed as though normally destined for the secondary PCI bus. The darker directed line in FIG. 2 depicts a downstream write transaction. Data flows from the primary bus master device 200 on primary PCI bus 252 to PCI bridge flow circuits 2 of bridge circuit 206. The data is then applied via the downstream path of PCI bridge flow circuits 2 and via bus 254 to pad flow circuit 6. Pad flow circuit 6 applies the signals from bus 254 to bi-directional I/O pad 8 and bus 255 via bus 253.

Since the downstream transaction is addressed to the secondary PCI bus 256 and the configuration parameters 10 define an overlapping region with the shared memory bus 250, shared memory flow circuit 4 receives and processes the transaction signals on bus 255. The internal target of shared memory flow circuit 4 responds to the signals of the internal master of PCI bridge flow circuit 2. The write data of the transactions is then passed through the shared memory flow circuit 4 and into the shared memory 202 on shared memory bus 250.

Figure 3:
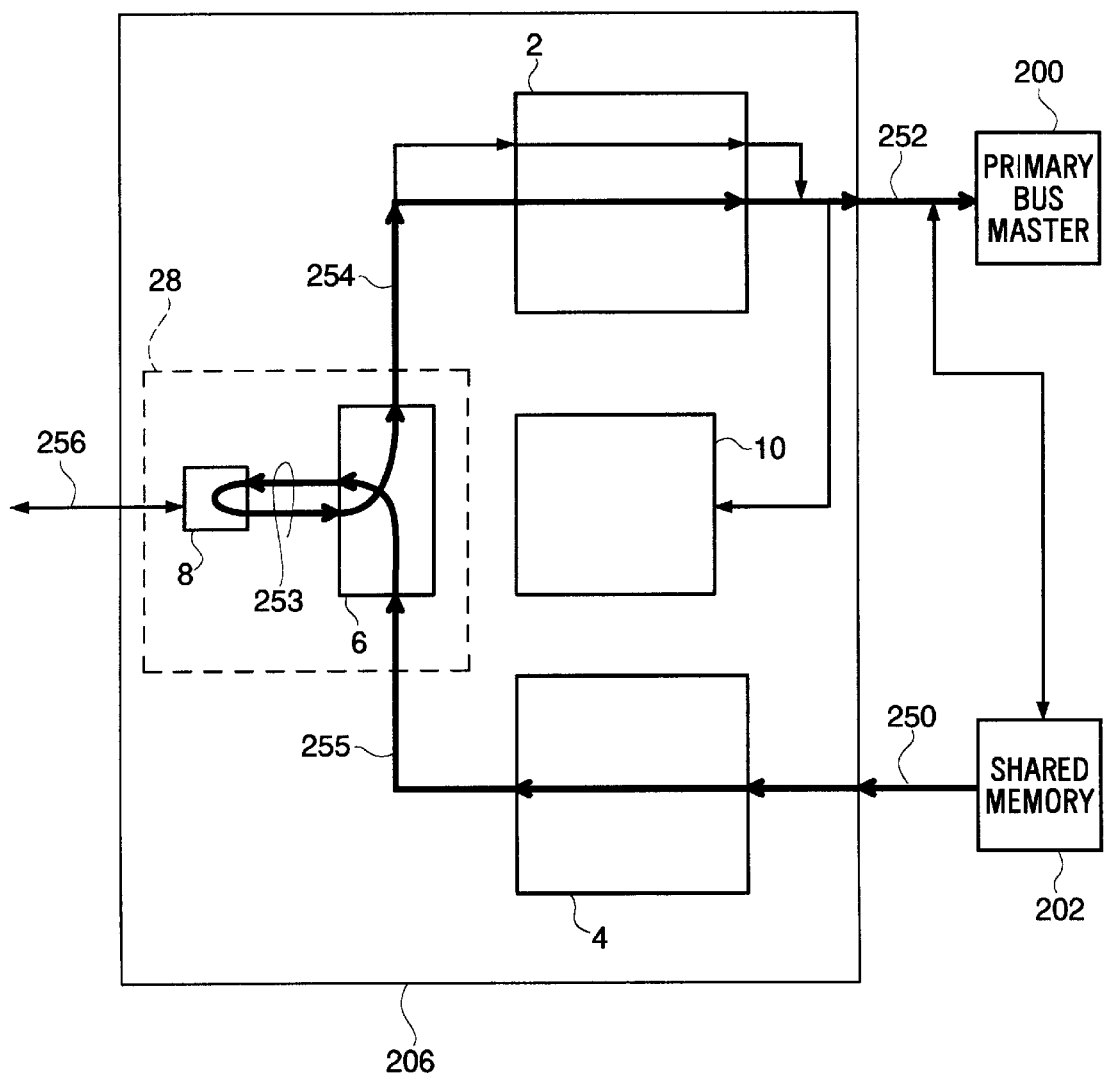
FIG. 3 is a block diagram of the bridge circuit of FIG. 1 operable to transfer information from a shared memory in an downstream read loopback mode transaction.

FIG. 3 depicts the same loopback mode operation of the bridge circuit 206 where downstream read transactions return requested read data from the shared memory 202. The darker directed line in FIG. 3 depicts a downstream read transaction. Data flows from the shared memory 202 on shared memory bus 250 to shared memory flow circuits 4 of bridge circuit 206. The data is then applied to bus 255 and onto bi-directional I/O pad 8 (via pad flow circuit 6 and bus 253). The signals on the bi-directional I/O pad 8 are applied via bus 253 and pad flow circuit 6 to bus 254 and then to PCI bridge flow circuits 2. The return read data then flows via the downstream path of PCI bridge flow circuits 2 to primary PCI bus 252 and then to primary bus master 200.

As shown in FIGS. 2 and 3, primary bus master 200 is directly connected to shared memory 202 via primary PCI bus 252. This connection is used in normal operation for the bus master to access the shared memory independent of the bridge circuit 206. In loopback mode operation, the primary bus master 200 uses its direct connection to shared memory 202 to verify proper operation of the loopback mode transactions with shared memory 202 via bridge circuit 206.

In the loopback mode test depicted in FIGS. 2 and 3, significant portions of bridge circuit 206 are tested without requiring a device present on secondary PCI bus 256. In particular, the loopback mode tests the downstream path of the primary interface (PCI bridge flow circuits 2), internal bridge buses and data paths (such as buses 253, 254, and 255), and the primary PCI bus 252 and the shared memory bus 250. In addition, the operation of primary bus master 200, shared memory 202 and primary PCI bus 252, all external to bridge circuit 206, may be tested in this manner. Secondary PCI bus 256, external to bridge circuit 206, is tested to the extent that a "stuck at" fault or short between bus signals may be located and partially isolated.

This loopback test mode feature of the bridge circuit 206 of the present invention provides myriad benefits as compared to bridge circuits of prior designs. In particular, chip level testing is more effective. The loopback mode permits more of the bridge circuit 206 to be tested by any given test vector. The number of test vectors required to adequately cover the testing of the bridge circuit may therefore be reduced. Each test vector may cover a larger portion of the chip test function. In addition, fault isolation in the board or application test environment is enhanced. Use of the shared memory in loopback test mode adds a third component to aid in determining the cause of a problem. For example, if loopback operations to the shared memory fail while direct access between the primary bus master 200 and the shared memory 202 via primary PCI bus 252 succeed, then the fault may be isolated to other than primary PCI bus 252, and vice versa. Similarly, if downstream transactions to a target device on the secondary PCI bus 256 fail while the loopback mode operations to shared memory 202 succeed, then the fault may be isolated to the target device or secondary PCI bus 256 (external to the bridge circuit 206).

FIG. 4 is a flowchart describing the method of operating the bridge circuit 206 of FIGS. 1–3 to perform the loopback mode testing. Element 300 is first operable to configure the bridge circuit 206 to enable loopback mode operation. Specifically, the secondary bus address register 12 and the shared memory address register 14, both of configuration parameters 10 of FIG. 1, are written so as to define an overlapping region. The overlapping region may be the entire region or a portion of the two regions.

Element 302 and 304 are then operable to initiate write and read downstream transactions, respectively, from within the primary bus master 200 of FIGS. 2 and 3. The transactions are directed to the address space defined to overlap by operation of element 300. Element 306 is then operable to validate the operation of the read and write transactions. For example, the data read back should be identical the data written. The data content of the shared memory 202 of FIGS. 2 and 3 may be interrogated to help isolate the cause of any failure detected.

Element 308 then determines whether the test succeeded or failed as indicated by the validation performed in element 306. If the test succeeded, element 310 so indicates and if the test failed, element 312 so indicates. In either case, element 314 then restores the address registers of configuration parameters 10 to their state for normal operation.

One skilled in the art will recognize that the tests performed by elements 302–312 may be significantly more complex. A wide variety of test methods and test data sequences and timings may be applied to further isolate the nature and cause of a fault. The flowchart of FIG. 4 is therefore representative of all such test sequences which may be applied while the bridge circuit is enabled for loopback operation in accord with the present invention.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A bus bridge circuit comprising:
    a primary interface connecting said bus bridge to a primary I/O bus;
    a secondary interface connecting said bus bridge to a secondary I/O bus and adapted for bi-directional exchange of data elements with said primary interface;
    a shared memory interface connecting said bus bridge to a shared memory bus external to said bus bridge circuit and adapted for bi-directional exchange of data elements with said secondary interface; and
    configuration control circuits for directing loopback data transfers between said primary interface and said shared memory interface via said secondary interface.

2. The bridge of claim 1 wherein said primary I/O bus is a PCI compliant bus.

3. The bridge of claim 2 wherein said secondary I/O bus is a PCI compliant bus.

4. The bridge of claim 1 wherein said configuration control circuits includes:
    secondary interface addressing registers for programmably defining an address range corresponding to said secondary interface; and
    shared memory interface addressing registers for programmably defining an address range corresponding to said shared memory interface, wherein said secondary interface addressing registers and said shared memory interface addressing registers are programmable to identify an overlapping address space for loopback data transfers between said primary interface and said shared memory interface.

5. A PCI bus to PCI bus bridge circuit comprising:
    primary PCI interface means for connecting said bridge to an external master device through a primary PCI bus;
    secondary PCI interface means for connecting said bridge to peripheral I/O devices through a secondary PCI bus;
    shared memory interface means for connecting said bridge to a shared memory device through a shared memory bus external to said bus bridge circuit;
    secondary bi-directional I/O pad means connected to said secondary PCI interface means and connected to said primary interface means and connected to said shared memory interface means for application of data transferred between said primary PCI interface means and said secondary PCI interface means and for application of data transfers between said secondary PCI interface means and said shared memory interface means;
    configuration control means for directing loopback data transfers between said primary PCI interface means and said shared memory interface means via said secondary bi-directional I/O pad means.

6. The bridge of claim 5 wherein said configuration control means includes:
    secondary interface addressing registers for programmably defining a first address range corresponding to said secondary interface; and
    shared memory interface addressing registers for programmably defining a second address range corresponding to said shared memory interface, wherein said secondary interface addressing registers and said shared memory interface addressing registers are programmable to define an overlapping address space between said first address space and said second address space for loopback data transfers between said primary interface and said shared memory interface.

7. A method for performing loopback testing of a bus bridge circuit having a primary interface, a secondary interface, and a shared memory interface, said method comprising the steps of:
    configuring an overlapping address space associated with said secondary interface and with said shared memory interface; and
    exchanging data between said primary interface to said shared memory interface via said overlapping address range to test said primary interface and to test said secondary interface and to test said shared memory interface.

8. The method of claim 7 wherein the step of configuring includes the steps of:
  setting a first address range in said bridge circuit corresponding to said secondary interface; and
  setting a second address range in said bridge circuit corresponding to said shared memory interface, wherein a portion of said first address range overlaps a portion of said second address range.

9. The method of claim 7 said bridge circuit includes secondary bi-directional I/O pads connected to said secondary interface and connected to said primary interface and connected to said shared memory interface, and wherein the step of exchanging includes the steps of:
  applying downstream write data from said primary interface to said secondary bi-directional I/O pads; and
  receiving said downstream write data in said shared memory interface via said secondary bi-directional I/O pads.

10. The method of claim 7 said bridge circuit includes secondary bi-directional I/O pads connected to said secondary interface and connected to said primary interface and connected to said shared memory interface, and wherein the step of exchanging includes the steps of:
  applying downstream read data from said shared memory interface to said secondary bi-directional I/O pads; and
  receiving said downstream read data in said primary interface via said secondary bi-directional I/O pads.

11. A system for loopback testing of a bus bridge circuit comprising:
  a bus bridge circuit having a primary interface and having a secondary interface and having a shared memory interface;
  a primary bus coupled to said primary interface of said bridge circuit;
  a master device coupled to said primary bus for applying downstream transactions to said bridge circuit via said primary bus;
  a shared memory bus coupled to said shared memory interface of said bridge circuit;
  a memory device external to said bus bridge circuit and coupled to said shared memory bus wherein said memory device is also coupled to said primary bus; and
  means in said bridge circuit for controllably directing said downstream transactions from said master device through said bridge circuit to said memory device via said primary interface and said shared memory to perform loopback testing of said bridge circuit.

12. The system of claim 11 wherein the means for directing includes:
  means for redirecting said downstream transactions addressed to said secondary interface to said shared memory interface.

13. The system of claim 12 wherein said means for redirecting includes:
  secondary interface addressing registers for programmably defining an address range corresponding to said secondary interface; and
  shared memory interface addressing registers for programmably defining an address range corresponding to said shared memory interface, wherein said secondary interface addressing registers and said shared memory interface addressing registers are programmable to identify an overlapping address space for loopback data transfers between said primary interface and said shared memory interface.

14. In a system with a bus bridge having a primary interface and having a secondary interface and having a shared memory interface, a method for performing loopback testing of said bridge circuit comprising the steps of:
  generating a downstream transaction within a master device coupled to said bridge circuit at said primary interface;
  directing said downstream transaction from said master device to said bridge circuit through said primary interface;
  redirecting, within said bridge circuit, said downstream transaction to said shared memory interface;
  applying; said downstream transaction to a memory device coupled to said bridge circuit at said shared memory interface; and
  verifying proper completion of said downstream transaction through an independent bus coupling said master device to said memory device independent of said bridge circuit.

15. The method of claim 14 further comprising the step of:
  configuring said bridge circuit to enable redirection of said downstream transaction to said shared memory interface.

16. The method of claim 15 wherein the step of configuring includes the step of:
  setting a first address range in said bridge circuit corresponding to said secondary interface; and
  setting a second address range in said bridge circuit corresponding to said shared memory interface, wherein a portion of said first address range overlaps a portion of said second address range.

17. The method of claim 14
wherein said downstream transaction is a write request to write predetermined data in said memory device, and
wherein the step of verifying includes the step of:
  reading data written to said memory through said independent bus; and
  comparing the read data to said predetermined data to verify proper operation of said bridge circuit.

18. The method of claim 14
wherein said downstream transaction is a read request to read previously written data from said memory device, and
wherein the step of verifying includes the step of:
  writing predetermined data to said memory through said independent bus; and
  comparing the predetermined data to the read data to verify proper operation of said bridge circuit.

* * * * *